June 23, 1970  F. M. WELCH  3,516,929
ROTATING BIOLOGICAL CONTACTOR IN A COMBINED SEWER
Filed Nov. 12, 1968  4 Sheets-Sheet 1

Inventor
Fredrick M. Welch
by Robert C. Sullivan
Attorney

June 23, 1970     F. M. WELCH     3,516,929
ROTATING BIOLOGICAL CONTACTOR IN A COMBINED SEWER
Filed Nov. 12, 1968     4 Sheets-Sheet 2

Inventor
Fredrick M. Welch
By Robert C. Sullivan
Attorneys

United States Patent Office 3,516,929
Patented June 23, 1970

3,516,929
ROTATING BIOLOGICAL CONTACTOR IN
A COMBINED SEWER
Fredrick M. Welch, Oconomowoc, Wis., assignor to Allis-Chalmers Manufacturing Company, Milwaukee, Wis.
Filed Nov. 12, 1968, Ser. No. 774,681
Int. Cl. C02c 1/02
U.S. Cl. 210—17                                17 Claims

ABSTRACT OF THE DISCLOSURE

A sewage treatment apparatus and method in accordance with which a rotating biological contactor is positioned within a combined sewer which carries both storm water and domestic and/or industrial waste. In a preferred form of the invention, a plurality of sewage flow channels are provided, with a rotating biological contactor apparatus being provided in each channel to act upon the sewage flowing therein. Means are provided for sequentially filling the respective channels during dry weather conditions and for discharging the channels in at downstream direction with a flush action. Means are also provided for permitting passage of sewage and storm water through all of the channels simultaneously under storm flow conditions.

BACKGROUND OF THE INVENTION

Field of the invention

This invention relates to a sewage treatment apparatus and method and more particularly to a sewage treatment apparatus and method utilizing a rotating biological contactor in a combined sewer.

Description of the prior art

One of the major sources of water pollution is that caused by the discharge of raw sewage from combined sewer systems to the nation's waterways. A combined sewer is one designed to carry both storm water and sewage in the same conduit. During periods of heavy rainfall, combined sewer overflows discharge raw sewage along with accumulated organic material that has been flushed from catch basins, gutters, etc., and the sewer line itself by the storm water into the receiving waterways.

Various methods of combating this pollution problem such as complete separation of sewer systems, retention areas, chlorination, etc., have been proposed, but the estimated costs have been excessive.

During a rainstorm, approximately 5.8 million gallons of runoff are produced per square mile per inch of rainfall. For the city of Chicago, with 190 square miles of sewered area, the storm water runoff would total over one billion gallons per inch of rain. For the city of Milwaukee, which has over 27 square miles of combined sewer systems, the runoff for this area alone would be well over 150 million gallons per inch of rainfall. The capacity of Milwaukee's waste treatment plant for domestic and industrial wastes is 200 million gallons per day. Therefore, Milwaukee would have to more than double the present capacity of its existing plant just to accommodate the combined sewer overflow during periods of heavy rainfall. Even if the existing plants were expanded, the existing activated sludge process used in most municipal sewage treatment plants would be ineffective, as it is doubtful if the required amount of bacteria could be retained and utilized when needed.

It is evident that most communities which have combined sewer systems cannot provide adequate intercepting sewers (sewers which carry the normal dry weather flow to the waste treatment plant), or waste treatment plants to treat the entire flow from a combined sewer system. Therefore, the excess storm water and sewage which is carried by a combined sewer must be discharged to a waterway.

Although under storm flow conditions the sanitary sewage flow in the combined sewer is diluted by factors of 10 to 20 times with storm water, when the entire combined overflow system is analyzed, it can be seen that though the sewage concentration may be lower is some instances than raw sewage, the large volumes of combined sewage create a very definite pollution problem.

Various methods and apparatus have been proposed to alleviate the storm water pollution problem. However, all of the suggested methods and apparatus appear to be very expensive and in most instances would require large storage areas.

It is known in the art of sewage treatment to utilize in the secondary or biological treatment step what may be referred to as a "rotating biological contactor" including a rotating member which is covered with aerobic bacterial slime and which is rotated so as to bring the biological slime on the rotating member alternately into contact with the sewage being treated and with the oxygen-containing atmosphere.

One example of a rotating biological contactor is shown by U.S. Pat. 2,433,884 issued to John G. Bevan on Jan. 6, 1948, which shows a drum or cylinder type of rotatable biological contactor.

A preferred form of rotating biological contactor is shown by British Pat. 935,162 to Hans Hartmann, published on Aug. 28, 1963, which shows the use of a plurality of disk members extending parallel to the direction of sewage flow and mounted on a shaft, which extends transverse of the direction of sewage flow. The disk members are coated with a bacterial film, and are rotated into alternate contact with atmospheric oxygen and with the sewage to be treated. The bacterial slime on the rotating disks consists principally of aerobic bacteria which have the ability to adsorb, absorb, coagulate and oxidize the undersirable organic constituents of the sewage and to change such constituents into unobjectionable forms of matter. The presence of the biological film or slime on the rotating disks also greatly increases the transfer of oxygen to the sewage through which the disks rotate thereby promoting the multiplication or synthesis of the aerobic bacteria already present in the mixed liquor and in the bacterial film, as well as increasing the ability of the aerobic bacteria to act upon the sewage and reduce it to unobjectionable forms.

SUMMARY OF THE INVENTION

Accordingly, it is an object of the invention to provide an apparatus for and method of treating sewage in combined sewers.

It is another object of the invention to provide an apparatus for and method of handling sewage flow in a combined sewer under dry weather conditions.

It is still another object of the invention to provide an apparatus for and method of treating sewage wastes in a combined sewer under storm conditions.

Still a further object of the invention is to provide an apparatus for treating sewage waste in a combined sewer which is adapted to handle waste under both dry weather flow conditions and under storm water flow conditions.

Still a further object of the invention is to provide an apparatus for and method of treating sewage waste in a combined sewer under dry weather flow conditions in accordance with which the waste is discharged downstream of the sewer with a flushing action.

In achievement of these objectives there is provided in accordance with an embodiment of the invention a sewage treatment apparatus and method in accordance with which a rotating biological contactor is positioned within a combined sewer which carries both storm water and domestic and/or industrial waste. In a preferred form of the invention, a plurality of sewage flow channels are provided, with a rotating biological contactor means being provided in each channel. Means are provided for sequentially filling the respective channels during dry weather conditions and for discharging the channels in a downstream direction with a flush action. As it passes through the respective channels, the sewage is acted upon by the rotating biological contactor means. Means are also provided for permitting passage of sewage and storm water through all of the channels simultaneously under storm flow conditions. Under storm flow conditions, the combined sewage and storm water is also acted upon by the rotating biological contactor means in the channels.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENT

Figure 2:
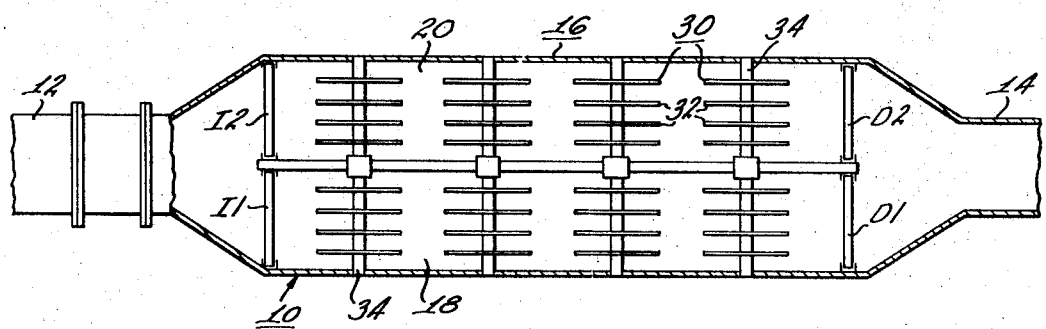
FIG. 2 is a view in horizontal section of the combined sewer of FIG. 1.
Figure 1:
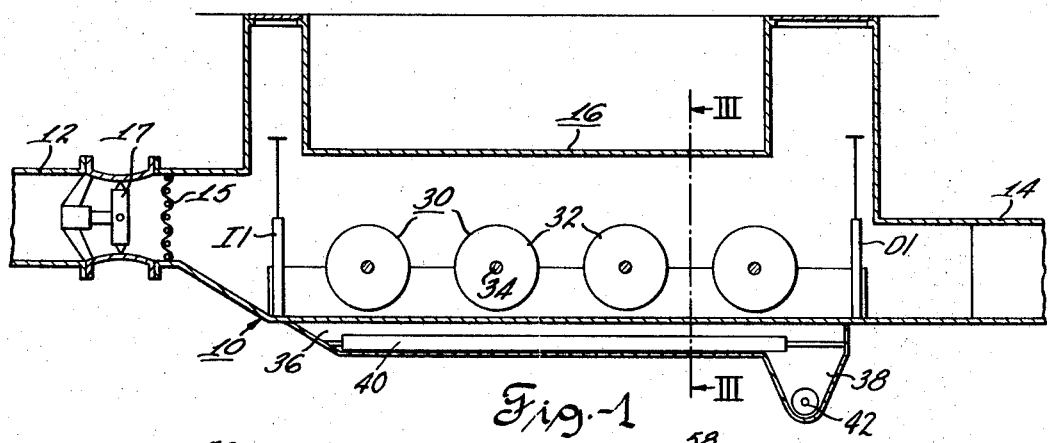
FIG. 1 is a view in vertical section taken along line I—I of FIG. 3 of a combined sewer including a rotating biological contactor in accordance with the invention.
Figure 3:
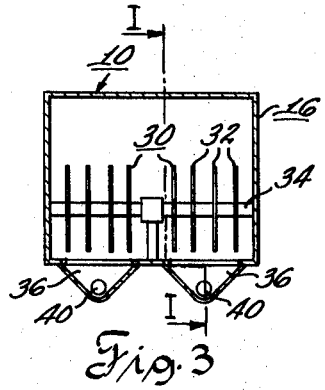
FIG. 3 is a view in transverse section of the combined sewer of FIGS. 1 and 2 taken along line III—III of FIG. 1.

Referring now to the drawings and more particularly to FIGS. 1-3 inclusive, there is shown a combined sewer generally indicated at 10 having an enlarged intermediate section generally indicated at 16 inserted therein between the upstream and downstream sections 12 and 14, respectively, of the sewer. The enlarged intermediate section 16 is divided by a central partition into two parallel channels 18 and 20. Each of the channels 18 and 20 has an inlet gate I1, I2, respectively, which when opened places the respective channels into communication with the upstream section 12 of the combined sewer. Each of the channels 18 and 20 also has an outlet or discharge gate D1, D2, respectively, which when opened communicates the interior of the respective channels with the downstream section 14 of the combined sewer. Each of the channels 18 and 20 has mounted for rotation therein a plurality of rotating biological contactors generally indicated at 30.

A preferred form of rotating biological contactor is similar to that shown by British Pat. No. 935,162 issued to Hans Hartmann, published Aug. 28, 1963, and includes a plurality of disk members 32 extending parallel to the direction of sewage flow and mounted on a shaft 34 which extends transverse of the direction of sewage flow. The disk members are coated with a bacterial film and are rotated into alternate contact with atmospheric oxygen and with the sewage to be treated. The bacterial slime on the rotating disks consists principally of aerobic bacteria which has the ability to adsorb, absorb, coagulate and oxidize the undesirable organic constituents of the sewage and to change such constituents into unobjectionable forms of matter. The aerobic bacterial film may be seeded on the disks, but need not be seeded since it accumulates naturally on the disks after several days contact with the sewage passing through the sewer.

The presence of the biological film or slime on the rotating disks 32 also greatly increases the transfer of oxygen to the sewage through which the disks rotate, thereby promoting the multiplication or synthesis of the aerobic bacteria in the sewage, or sloughed from the rotating disks, and in the bacterial film on the disks, as well as increasing the ability of the aerobic bacteria to act upon the sewage and reduce it to unobjectionable forms.

The rotating biological contactors 30 are continuously rotatably driven by a suitable drive means such as a variable speed electric motor. The disks may be rotated at a relatively slow rate, such as 5 r.p.m., for example, but may also be driven at a faster rate such as 40 r.p.m., for example. It will be understood that these speed values are given by way of example only and are not intended to be limiting. Disk diameters may be in the range, for example, of 1 foot to 15 feet.

The shafts 34 upon which the disks 32 are mounted are preferably at a height such that as the disks rotate, substantially half of the area of the disk is immersed in the biodegradable sewage or waste water in the respective channel 18 or 20, while the other half of the disk area is rotating through an oxygen-containing atmosphere above the level of the sewage in the channels 18 and 20. If necessary, suitable air vents may be provided in the sewer to provide fresh air in the sewer line. Means may also be provided for forcing air through the sewer, if necessary.

A suitable screening device 15 is located in the combined sewer 10 just prior to the entrances to the channels 18 and 20 for the purpose of screening out foreign bodies which might damage the rotating biological contactors in the channels 18 and 20.

Also, a grinding or comminuting device 17 is provided adjacent the screening device 15 to condition the solids in the sewage for treatment by the rotating biological contactors 30 in the channels 18 and 20, or to permit passage of the solids past the rotating biological contactor.

As can best be seen in the views of FIGS. 1 and 3, a sump 36 is provided beneath the channels 18 and 20 lengthwise thereof for collecting grit and settleable solids from the sewage passing through channels 18 and 20. The sump 36 communicates at the downstream end thereof with a deeper and enlarged transverse sump 38. A conveyor means such as an auger or belt conveyer 40 or other suitable conveying means is preferably provided along the length of the sump 36 for delivering grit and settleable solids which have collected in the sump 36 to the enlarged transverse sump where they may be picked up by another means such as an auger or belt conveyor 42 or the like and discharged to a storage region or to a separate sewer system.

CONTROL SYSTEM FOR INLET AND DISCHARGE GATES

Control means are provided which will now be described for controlling the opening and closing of the various inlet gates I1, I2, and of the discharge gates D1, D2 of the channels 18 and 20 in such manner that under dry weather conditions each of the respective channels 18 and 20 is alternately filled and then discharged with a flush action to flush the downstream section 14 of the sewer. The control system also provides for opening all inlet and discharge gates during storm weather conditions.

The control system by means of which the inlet gates

I1 and I2 of the respective channels 18 and 20 and the discharge gates D1 and D2 of the respective channels 18 and 20 are automatically controlled will now be described.

Figure 5:
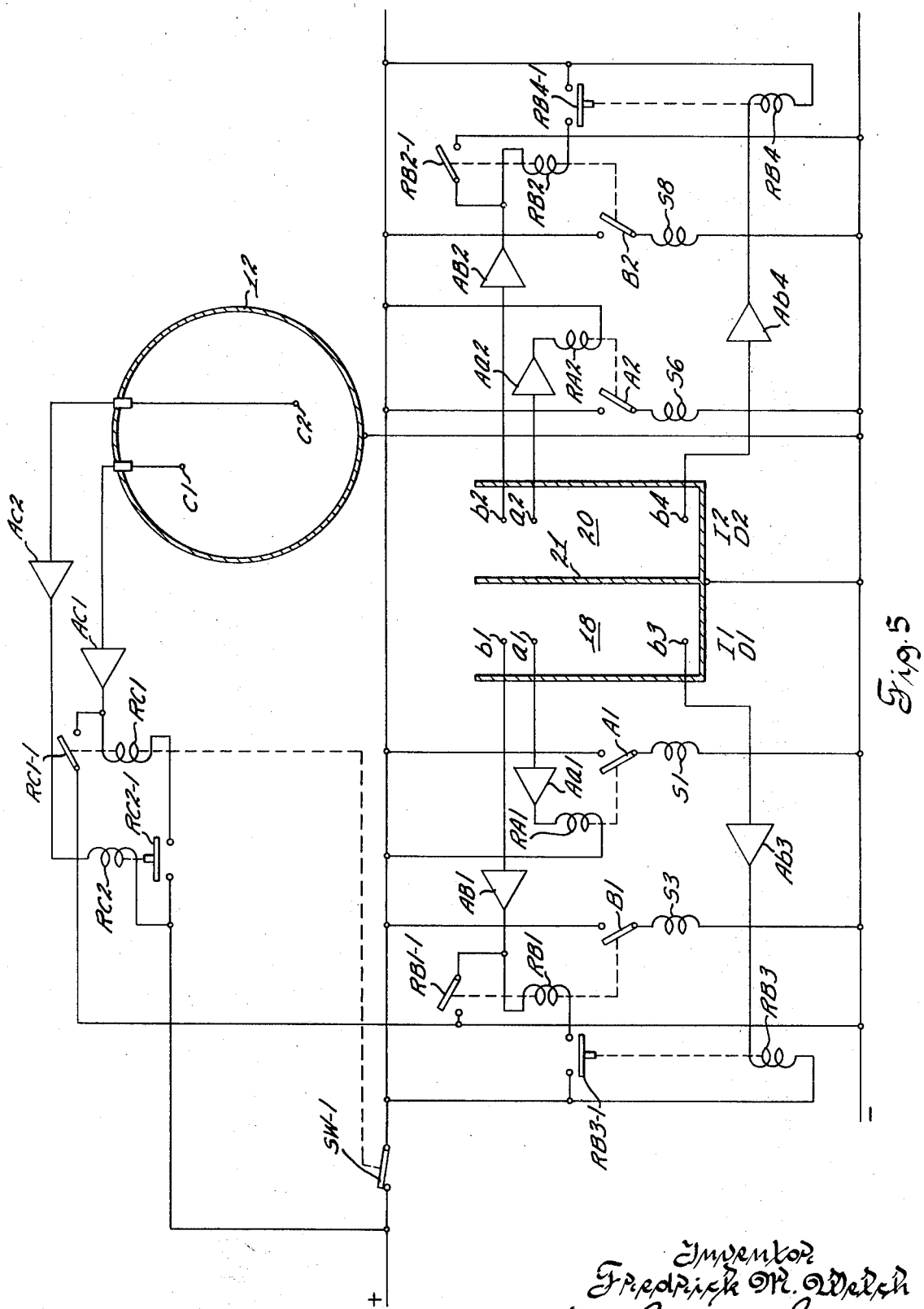
FIG. 5 is a diagrammatic view of the location of the liquid level controlled switches used in the gate control system for the sewage flow channels, including the controls directly associated with the liquid level controlled switches, and also showing the control system responsive to storm water conditions.

Referring now to the schematic view and control diagram of FIG. 5 which shows the two channels 18 and 20 in transverse cross section, it will be noted that channel 18 is provided with three liquid level probes respectively indicated at $b1$, $a1$ and $b3$. Liquid level probe $b1$ is located at the uppermost level to which it is desired that liquid rise in channel 18; probe $a1$ is located adjacent the upper end of channel 18 but spaced below probe $b1$; and liquid level probe $b3$ is positioned adjacent the bottom end of channel 18. Similarly, channel 20 is provided with probes $b2$, $a2$ and $b4$ which are respectively positioned at the same levels as probes $b1$, $a1$, and $b3$ of channel 18. The height of the probes $b1$, $b2$ is preferably such that the maximum liquid level in the channels 18 and 20 will cause rotatable bacteria supporting members such as rotatable disks of the rotatable biological contactor to be substantially half immersed in the liquid. The channels 18 and 20 are suitably connected at ground potential and thus to the negative side of the power supply. All of the probes are suitably insulated from the grounded channel structure.

The level or heights of the various probes may be adjusted to obtain optimum operation.

If it is not feasible to connect the channel structure itself to ground potential, a probe or electrode connected to the negative side of the electrical power supply may be positioned in each channel at a level below that of all of the other probes in the channels. All of the probes are electrically conductive and connected in liquid conduction circuits whereby a circuit is established from the respective probes to the grounded channel structure and thus to the negative side of the power supply when the liquid level rises to the level of any one of the respective probes.

Probe $b1$ is connected through an amplifier $Ab1$, to one side of the operating coil of relay RB1 in series with the normally open contact RB3–1, controlled by probe $b3$ and its associated relay RB3, to the positive side of the power supply.

It will be seen that relay RB1 is energized when the liquid level in channel 18 rises to the level of probe $b1$ to thereby complete a circuit through contact RB3–1 to the relay coil RB1 across the power supply. The operating coil of relay RB1 when energized closes a normally open seal-in contact RB1–1 which maintains operating coil RB1 energizsed until the liquid level drops below the probe $b3$ which is positioned near the bottom of channel 18. As long as the liquid level in channel 18 is as high as probe $b3$, the operating coil of relay RB3 is energized through amplifier $Ab3$ to close normally open contact RB3–1 in series with the operating coil of relay RB1. Normally open contact B1 which is operated to closed position by energization of the operating coil of relay RB1 is connected across the power supply in series with solenoid S3 which operates various contacts of the control circuit as will be explained more fully in connection with the description of the control diagram of FIG. 6.

Liquid level probe $a1$ is connected through an amplifier $Aa1$ to the operating coil of relay RA1 whereby when the liquid level in channel 18 rises to the level of probe $a1$, the operating coil of relay RA1 is energized to close normally open contact A1 in series with solenoid S1 to energize solenoid S1. Solenoid S1 controls various contacts in the control circuit as will be described more fully in connection with the description of the control diagram of FIG. 6.

Liquid level probe $b2$ of channel 20 is connected through amplifier $Ab2$ to the operating coil of relay RB2 in series with normally open contact RB4–1, operated by relay RB4 associated with probe $b4$, across the power suply. Relay RB2 is provided with a seal-in contact RB2–1 which maintains the relay RB2 closed even after the liquid level has dropped below the level of probe $b2$ as long as contact RB4–1 remains closed. The liquid level probe $b4$ near the bottom of channel 20, is connected through amplifier $Ab4$ to the operating coil of relay RB4 and maintains that relay energized to maintain contact RB4–1 closed as long as the liquid level in channel 20 is high as or higher than liquid level probe $b4$.

When relay RB2 is energized, it closes normally open contact B2 to complete the energization of solenoid S8. Solenoid S8 operates various contacts in the control circuit, as will be explained more fully in connection with the description of the control diagram in FIG. 6.

Liquid level probe $a2$ is connected through amplifier $Aa2$ to the operating coil of relay RA2 across the power supply, whereby relay RA2 is energized when the liquid level in channel 20 rises to the level of probe $a2$. When relay RA2 is energized it operates normally open contact A2 to closed position to thereby energize solenoid S6 which operates various contacts in the control circuit as will be described in connection with the description of the control diagram of FIG. 6.

Figure 6:
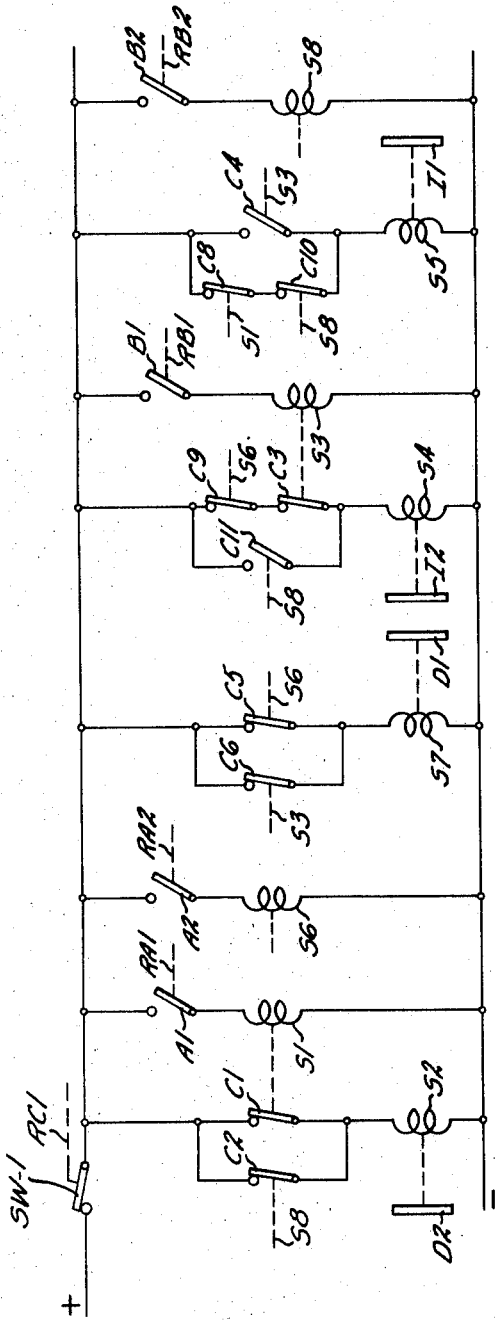
FIG. 6 is a schematic diagram of the gate control system for the sewage flow channels of the apparatus.

Referring now to FIG. 6, the gate control system comprises the following circuits connected across the power supply:

(1) Solenoid S1 is connected across the power supply in series with normally open contact A1 which is controlled by the operating coil of relay RA1 (FIG. 5). Solenoid S1 controls normally closed contact C1 and normally closed contact C8.

(2) Solenoid S2 is connected across the power supply in series with the parallel combination of normally closed contact C1 and normally closed contact C2. Solenoid S2 when energized closes discharge gate D2 of channel 20.

(3) Solenoid S3 is connected across the power supply in series with normally open contact B1 which is controlled by relay RB1 (FIG. 5). Solenoid S3 controls normally closed contact C3, normally open contact C4 and normally closed contact C6.

(4) Solenoid S4 is connected across the power supply in series with two parallel contact branches. One of the contact branches contains normally open contact C11 while the other parallel branch contains the series-connected normally closed contact C9 and the normally closed contact C3. When solenoid S4 is energized it closes inlet gate I2 of channel 20.

(5) Solenoid S5 is connected across the electrical power supply in series with two parallel-connected contact branches. One of the parallel contact branches contains normally closed contact C8 in series with normally closed contact C10. The other parallel contact branch includes normally open contact C4. When solenoid S5 is energized it closes inlet gate I1 of channel 18.

(6) Solenoid S6 is connected across the electrical power in series with normally open contact A2 which is controlled by relay RA2 (FIG. 5). Solenoid S6 controls normally closed contact C5 and normally closed contact C9.

(7) Solenoid S7 is connected across the electrical power supply in series with two parallel contacts C5 and C6. Contacts C5 and C6 are both normally closed contacts. When solenoid S7 is energized it closes discharge gate D1 of channel 18.

(8) Solenoid S8 is connected across electric power in series with normally open contact B2 which is controlled by relay RB2 (FIG. 5). Solenoid S8 controls normally closed contact C2, normally closed contact C10, and normally open contact C11.

From the foregoing it will be seen that solenoids S5, S4, S7 and S2 respectively control inlet gates I1, I2, D1, and D2. When any of the respective solenoids S5, S4, S7, S2 are energized, the respective gates which they control are moved to closed position, and when any of the respective solenoids S5, S4, S7, and S2 are deenergized, the respective gates which they control move to open position. This might be accomplished, for example, by providing plunger members of magnetic material on or connected to the respective gates so that energization of the corresponding solenoid will attract the plunger to cause movement of the respective gate to closed position. Spring means may be provided to return each gate to open position upon deenergization of its respective solenoid. This is a fail-safe feature which insures that in the event of electrical power supply failure or other interruption of the electrical power supply to the system, the gates will move to open rather than to closed position.

Figure 7:
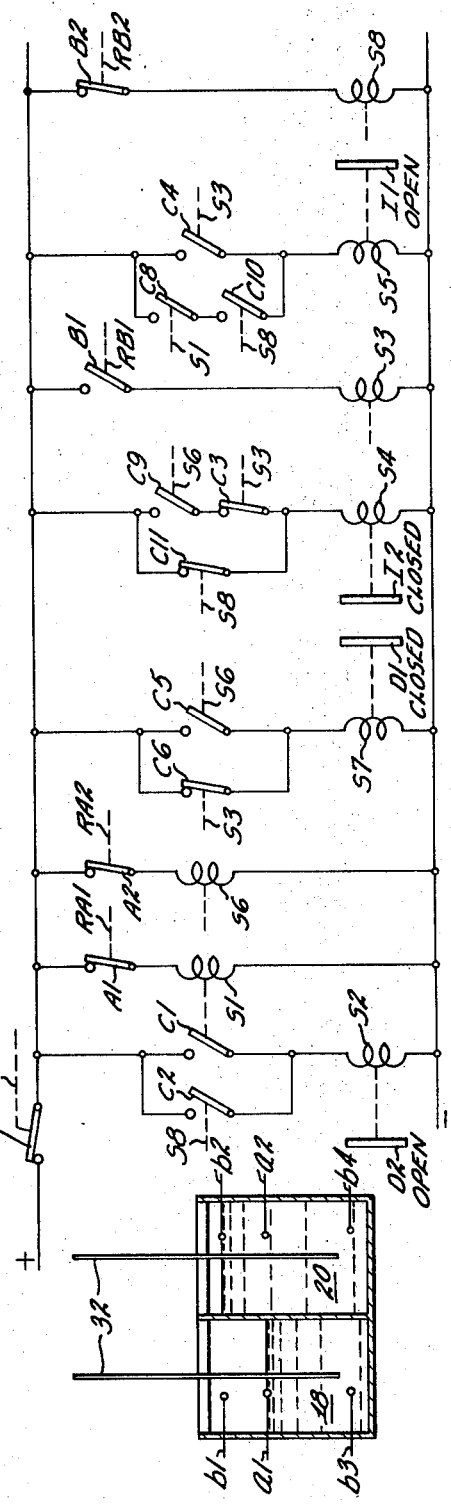
FIG. 7 is a control diagram showing the condition of the various control elements under one set of operating conditions.

In describing the operation of the two channels 18 and 20 and of the inlet and discharge gates which control the liquid flow through these channels, reference is first made to FIG. 7. It will be assumed that channel 20 is filled to its maximum operating level, the level of probe $b2$, with the inlet gate I2 and the discharge gate D2 thereof both in closed position; and that the channel 18 is filling and that the discharge gate D1 thereof is closed and the inlet gate I1 thereof is open.

As the liquid flows into channel 18, the level of the liquid will finally reach the level of probe $a1$. At this moment, the following circuit conditions will prevail as seen in FIG. 7 which is a view similar to FIG. 6 but showing the conditions of the various circuit elements at the time the level of liquid in channel 18 reaches and submerges probe $a1$. In this condition of the channels, probes $a1$ and $b3$ in channel 18 are submerged, and probes $b2$, $a2$ and $b4$ in channel 20 are submerged. The submersion of probe $b3$ closes a circuit which energizes relay RB3 which closes contact RB3–1 in the circuit of relay RB1 (FIG. 5). The submersion of probe $a1$ closes a circuit which energizes relay RA1 (FIG. 5) to close contact A1 to energize solenoid S1. The energization of solenoid S1 opens normally closed contact C1 in the circuit of solenoid S2 and opens normally closed contact C8 in the energization circuit of solenoid S5.

The immersion of probe $b4$ in channel 20 energizes relay RB4 to close normally open contact RB4–1 in the circuit of relay RB2 (FIG. 5). Immersion of probe $b2$ in channel 20 results in the energization of relay RB2 in series with normally open contact RB4–1 which is now closed due to immersion of probe $b4$ as just explained. Energization of relay RB2 closes normally open contact RB2–1 to "seal in" relay RB2 until the liquid level in channel 20 drops below the level of probe $b4$. The energization of relay RB2 results in the closing of switch B2 in series with solenoid S8 to cause the energization of solenoid S8. The energization of solenoid S8 results in the opening of normally closed contact C2 in the circuit of solenoid S2, results in the opening of normally closed contact C10 in the energization circuit of solenoid S5, and results in the closing of normally open contact C11 in the energization circuit of solenoid S4. Immersion of probe $a2$ of channel 20 results in the energization of relay RA2 (FIG. 5) to cause the closing of normally open contact A2, which results in the energization in solenoid S6. Energization of solenoid S6 results in the opening of normally closed contact C5 in the energization circuit of solenoid S7 and results in the opening of normally closed contact C9 in the energization circuit of solenoid S4.

Due to the fact that probe $b1$ of channel 18 is not immersed, relay RB1 (FIG. 5) is deenergized, with the result that contact B1 is open, resulting in the deenergization of solenoid S3. As a result normally closed contact C3 in the energization circuit of solenoid S4 is closed; normally open contact C4 in the energization circuit of solenoid S5 is open; and normally closed contact C6 in the energization circuit of solenoid S7 is closed.

From an inspection of FIG. 7, it will be seen that solenoid S5 which controls the inlet gate I1 of channel 18, is deenergized since contacts C8, C10, and C4 in the energization circuit of solenoid S5 are open. Because solenoid S5 is deenergized, inlet gate I1 of channel 18 is in open position.

From the inspection of FIG. 7, it can also be seen that solenoid S7 is energized, since normally closed contact C6 in the energization circuit thereof is closed. Since solenoid S7 is energized, discharge gate D1 of channel 18, controlled by solenoid S7, is in closed position.

From the diagram of FIG. 7, it will be seen that solenoid S4 is energized since normally open contact C11 is closed to complete the energization circuit of solenoid S4. Since solenoid S4 which controls inlet gate I2 of channel 20, is energized, inlet gate I2 of channel 20 is closed.

The deenergization of solenoid S2 which is due to the liquid level in channel 18 reaching the level of probe $a1$ with consequent opening of contact C1, causes an opening of discharge gate D2 of channel 20, resulting in the flush dumping of the contents of channel 20 into the downstream section of the sewer.

In the meantime, channel 18 continues to fill and when the level in that channel reaches the level of probe $b1$ the immersion of probe $b1$ energizes relay BR1 (FIG. 5) which is in series with normally open contact RB3–1 (closed at this time), to cause the closing of normally open contact B1 and the energization of solenoid S3. Energization of solenoid S3 is effective to perfom the following functions:

(1) to close the inlet gate I1 of channel 18;
(2) to close the discharge gate D2 of channel 20; and
(3) to open the inlet gate I2 of channel 20.

Figure 8:
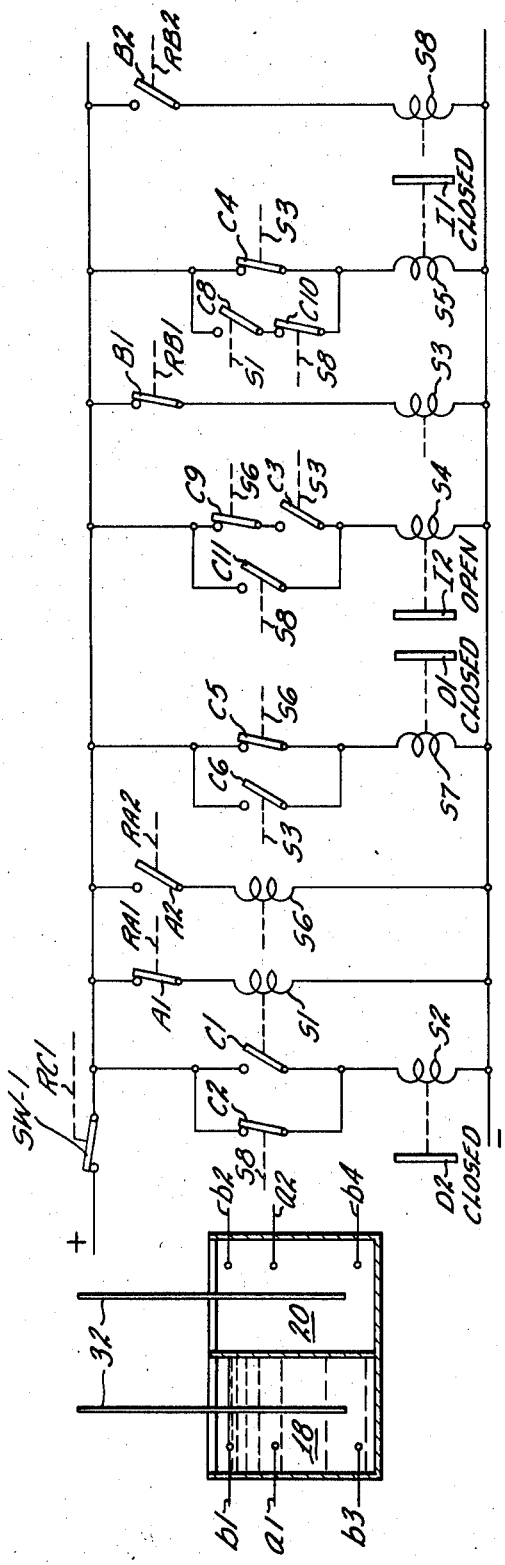
FIG. 8 is a control diagram showing the condition of the various control elements under another set of operating conditions.

This can be seen by reference to the circuit diagram of FIG. 8 which shows the control circuit conditions the moment the liquid level in channel 18 has risen sufficiently high to immerse the probe $b1$ after channel 20 has been dumped with the flush action as previously described. It should be noted that in the interval during which the level of the filling channel 18 is rising from the level of probe $a1$ to the level of probe $b1$ the discharge gate D2 of channel 20 remains open and the inlet gate I2 of channel 20 remains closed.

Since, at the moment when probe $b1$ of channel 18 becomes immersed on the filling action of channel 18 channel 20 is substantially completely empty with the result that probes $b2$, $a2$ and $b4$ of channel 20 are all uncovered or non-immersed, it will be apparent that the following conditions will prevail at this moment as seen from the control diagram of FIG. 8.

Since both probes $b2$ and $4b$ of channel 20 are not immersed, switch B2 is open, resulting in the de-energization of solenoid S8. As a result, normally closed contact C2 in the energization circuit of solenoid S2 is closed; normally closed contact C10 is the energization circuit of solenoid S5 is closed; and normally open contact C11 in the energization circuit of solenoid S4 is open. Also, since probe $a2$ of channel 20 is not immersed at this moment, switch A2 is open, with the result that solenoid S6 is deenergized and normally closed contact C5 in the energization circuit of solenoid S7 is closed; and normally closed contact C9 in the energization circuit of solenoid S4 is closed.

Since probes $b1$ and $b3$ of channel 18 are both immersed, switch B1 is closed. As a result, solenoid S3 is energized and normally closed contact C3 in the energization circuit of solenoid S4 is open; normally open contact C4 in the energization circuit of solenoid S5 is closed, and normally closed contact C6 in the energization circuit of solenoid S7 is open. Also, since probe $a1$ of channel 18 is immersed, switch A1 is closed resulting in the energization of solenoid S1. As a result of the energization of solenoid S1 normally closed contact C1 in the energization circuit of solenoid S2 is open and normally closed contact C8 in the energization circuit of solenoid S5 is open.

From the foregoing, and from observation of FIG. 8, it will be obvious that the various inlet and discharge gates are in the following positions when probe $b1$ is immersed on the upward or filling movement of the liquid in channel 18:

(1) since normally open contact C4 in the energization circuit of solenoid S5 is closed, solenoid S5 is energized and inlet gate I1 of channel 18 is closed;

(2) since normally closed contact C5 in the energization circuit of solenoid S7 is closed, solenoid S7 is energized and the discharge gate D1 of channel 18 is closed;

(3) since normally closed contact C3 and normally open contact C11 in the energization circuit of solenoid S4 are both open, solenoid S4 is de-energized and inlet gate I2 of channel 20 is open;

(4) since normally closed contact C2 in the energization circuit of solenoid S2 is closed, solenoid S2 is energized and discharge gate D2 of channel 20 is closed.

From the foregoing detailed summary, the following brief summary of operation may be made:

(1) With channel 20 already filled to the level of probe $b2$ and with both its inlet gate I2 and discharge gate D2 in closed position, and with channel 18 filling and with its inlet gate I1 open and its discharge gate D1 closed, the control circuitry will be actuated when the level in channel 18 becomes sufficiently high to immerse probe $a1$, and will be effective at that moment to open the discharge gate D2 of channel 20 to permit the contents of channel 20 to be discharged with a flush action into the downstream section of the sewer.

(2) With channel 20 discharged or discharging as described in (1), channel 18 continues to fill until the liquid therein becomes sufficiently high to immerse probe $b1$ at the upper end of channel 18, at which time control circuitry will be actuated to perform the following functions:

(1) to close the inlet gate I1 of channel 18;
(2) to close the discharge gate D2 of channel 20; and
(3) to open the inlet gate I2 of channel 20;

With channel 18 filled to its uppermost operating level so that probe $b1$ is immersed and with both the inlet gate I1 and the discharge gate D1 of channel 18 closed, and with channel 20 beginning to fill with the discharge gate D2 thereof closed and with the inlet gate I2 thereof open, the reverse action to that previously described up to this point will occur—that is channel 20 will be filling, and when the liquid level therein reaches the level of probe $a2$, will actuate control circuitry which will cause the flush discharge of channel 18.

It is believed from the foregoing description that it will be obvious that a similar sequence of events occurs to that previously described, but with the channels reversed, and therefore a detailed summary of the operation of the control circuit as channel 20 fills will not be given, since there is adequate basis in the control circuitry shown in FIGS. 5 and 6 for one skilled in the art to understand the operation. However it will be briefly pointed out that the following sequence of steps occurs when channel 18 is filled to the level of probe $b1$ and channel 20 is filling:

(1) when the level of liquid in the filling channel 20 reaches the level of probe $a2$, the control circuitry will be actuated to cause the opening of the discharge gate D1 of channel 18 with the consequent flush dumping of the contents of channel 18 into the downstream section of the sewer;

(2) When the liquid level in channel 20 reaches the level of the uppermost probe $b2$, it will actuate the electrical control circuitry to cause the following actions:

(1) to close the inlet gate I2 of channel 20;
(2) to close the discharge gate D1 of channel 18; and
(3) to open the inlet gate I1 of channel 18.

The filling and discharging of channels 18 and 20 as just described is continuously repeated.

It will be noted that each channel remains completely filled for the time required for the opposite channel to fill from an empty condition to the level $a1$ (channel 18) or $a2$ (channel 20). In addition, the rotating biological contactor is in contact with the sewage for the time required to fill the respective channel to the level $b1$ or $b2$. This time provides sufficient contact time of the rotating biological contactor with the sewage to insure proper biological treatment of the sewage.

Under storm flow conditions, all of the discharge gates D1, D2 and all of the inlet gates I1, I2 are open to permit the combined storm water plus the normal sanitary and/or industrial waste being carried by the combined sewer 10 to pass through both channels 18 and 20 simultaneously.

The control system which permits opening of all of the discharge gates and all of the inlet gates under storm conditions is shown diagrammatically in FIG. 5 of the drawings. A cross section of the sewer 12 a short distance upstream of the channels 18 and 20 is indicated at 12 in FIG. 5. The sewer 12 is suitably connected at ground potential and is thus connected to the negative side of the electrical power supply. If it is not feasible to connect the sewer itself to ground potential, a third probe or electrode connected to the negative side of the power supply may be positioned in the sewer at a level below that of both of the other probes. It will be noted that a probe $c1$ extends for a distance down into the upper portion of sewer 12, and that a second probe $c2$ extends down to a substantially lower height than the probe $c1$. Probes $c1$ and $c2$ are suitably insulated from the sewer structure. The levels or heights of the various probes may be adjusted to obtain optimum operation. The probes $c1$, $c2$, are similar to the probes $a1$, $a2$, $b1$, $b2$, $b3$ and $b4$ previously described in connection with FIG. 5. The probes $c1$, $c2$ respectively close circuits through the liquid material in the sewer when either probe is immersed.

Probe $c1$ is connected through an amplifier Ac1 to the operating coil of a control relay RC1 which is connected to the positive side of the power line through a contact RC2-1. The probe $c2$ is connected through an amplifier Ac2 to the operating coil of relay RC2, the opposite side of the operating coil of that relay being connected to the positive side of the electrical power source.

The height of the lower end of the probe $c2$ in the sewer 12 is above the level which is ordinarily reached by normal dry weather sewage flow in the combined sewer 12, but is still substantially below the height of the lower end of probe $c1$ which is positioned at a relatively much higher level in sewer 12.

Under storm flow conditions, the liquid level in sewer 12 arises sufficiently high to immerse probes $c1$ and $c2$. The immersion of the lower probe $c2$ will energize the operating coil of relay RC2 to close normally open contact RC2-1 in the circuit of the operating coil of relay RC1. The immersion of probe $c1$ will close a circuit through the operating coil of relay RC1 through the normally open contact RC2-1 which is now closed. The energization of the operating coil of relay RC1 causes the opening of normally closed contact SW-1 which disconnects the positive bus for the gate control circuits from the electrical power supply. The energization of the operating coil of relay RC1 also closes a seal-in contact RC 1—1 which completes the circuit of the operating coil of relay RC1 to the grounded negative side of the electrical power supply to bypass the path to ground through the liquid contents of sewer 12.

When switch SW-1 is opened due to storm conditions as just explained, the entire gate control system of FIGS. 5 and 6 is disconnected from the positive side of the electrical power supply, with the result that all of the gates of channels 18 and 20 are moved to open position by their spring operators to permit the free flow of the storm water and sewage through the channels 18 and 20. However, the opening of the switch SW-1 under storm conditions as just described does not affect the electrical power supply to the drive motors for the rotating biological contactors since these drive motors are connected in an electrical circuit or circuits (not shown) independent of the gate control circuits. The operating coil of relay RC1 remains energized to maintain switch SW-1 open until the liquid level in sewer 12 drops below the level of the lower end of probe c2. When the liquid drops below the level of probe c2, relay RC2 is deenergized and normally open contact RC2–1 opens to deenergize the circuit of the operating coil of relay RC1. Deenergization of the operating coil of relay RC1 causes the closure of normally closed switch SW-1 which reconnects the positive bus to the electrical power supply and thereby again provides power for the control circuits of FIGS. 5 and 6.

The following is a tabulation of the various relays and solenoids of the gate control system, of the contacts or gates controlled by the respective relays or solenoids, of the relays or solenoids controlled by the respective contacts, and an indication of whether the respective contacts are normally open or normally closed.

LIST OF RELAYS AND SOLENOIDS AND CONTACTS OR GATES CONTROLLED THEREBY

| Relay or solenoid | Contacts or gate controlled by relay or solenoid | Contact normally open or normally closed | Relay or solenoid controlled by contact |
|---|---|---|---|
| S1 | C1 | N.C | S2 |
|  | C8 | N.C | S5 |
| S2 | Gate D2 |  |  |
| S3 | C3 | N.C | S4 |
|  | C4 | N.O | S5 |
|  | C6 | N.C | S7 |
| S4 | Gate I2 |  |  |
| S5 | Gate I1 |  |  |
| S6 | C5 | N.C | S7 |
|  | C9 | N.C | S4 |
| S7 | Gate D1 |  |  |
| S8 | C2 | N.C | S2 |
|  | C10 | N.C | S5 |
|  | C11 | N.O | S4 |
| RA1 | A1 | N.O | S1 |
| RA2 | A2 | N.O | S6 |
| RB1 | B1 | N.O | S3 |
|  | RB1–1 | N.O | RB1 |
| RB2 | B2 | N.O | S8 |
|  | RB2–1 | N.O | RB2 |
| RB3 | RB3–1 | N.O | RB1 |
| RB4 | RB4–1 | N.O | RB2 |
| RC1 | SW–1 | N.C | Positive bus |
|  | RC1–1 | N.O | RC1 |
| RC2 | RC2–1 | N.O | RC1 |

During the normal dry weather flow of sewage alternately into the channels 18 and 20 as previously described, the rotating biological contactors 30 are rotated by their driving means to cause the disks 32 to be rotated alternately into contact with the sewage in the respective channels and with the oxygen-containing atmosphere above the sewage in the channels to thereby cause the bacterial film on the disks to adsorb, absorb, coagulate and oxidize the sewage in the respective channels, to thereby remove many of the undesirable organic constituents of the sewage. Thus, when the sewage is discharged with a flushing action into downstream section 14 of the combined sewer, the discharged sewage has been treated by the rotating biological contactors 30 to remove much of the pollution therefrom. Furthermore, a certain portion of the aerobic bacteria which forms the bacterial film on the disks is sloughed off during the course of operation of the rotating biological contactor, and such sloughed off bacteria are discharged downstream of the respective channels 18 and 20 during the flushing action and act on the sewage as it passes along the downstream section 14 of the combined sewer, to thereby further remove pollution from the sewage. The sloughed off bacteria also act on sewage which is introduced into the combined sewer downstream of the rotating biological contactor.

It should also be noted that the flushing action provided during normal dry weather flows through the combined sewer provides an improved sewage flow through the combined sewer. The combined sewer is usually of relatively large diameter as compared to a sanitary sewer, with the result that the normal sanitary sewage under dry weather conditions would not have a good flow characteristic in the absence of the flushing action.

Under storm flow conditions, when the combined sanitary and/or industrial waste plus the storm water is flowing through the channels 18 and 20 simultaneously, with continuous flow therethrough, the rotating biological contactors 30 are being rotated as previously described and are removing a certain percentage of the pollution from the material flowing through the channels, so that the combined storm water plus sanitary and/or industrial waste which is discharged to the downstream section 14 of the combined sewer 10 is in a much less polluted condition than it would be if the rotating biological contactors were not being used as described.

Even if the volume of the combined flow under storm conditions is sufficient to submerge the rotating biological contactors, the rotating biological contactors will still be effective to remove pollution from the combined flow since under storm conditions there is enough dissolved oxygen in the combined flow to sustain bacterial action of the rotating biological contactors.

Figure 4:
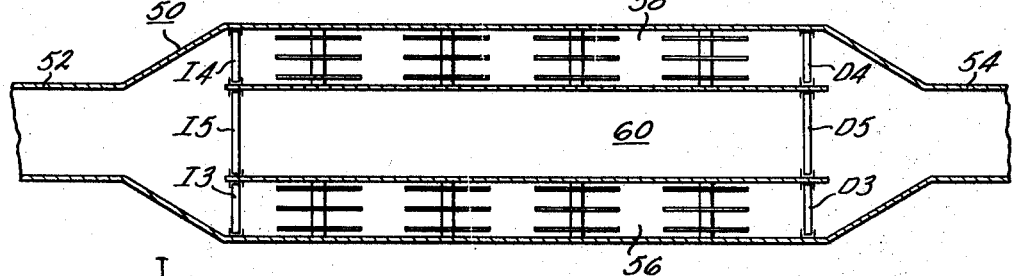
FIG. 4 is a view in horizontal section of a modified combined sewer arrangement.

Referring now to FIG. 4, there is shown a modified arrangement in which the channel sections having the rotating biological contactors therein are not positioned as an inserted section of the existing combined sewer but instead are placed in bypass relation to a section of the existing sewer.

Thus, as seen in FIG. 4, there is shown a combined sewer generally indicated at 50 including an upstream section 52, a downstream section 54, and a connecting section 60. Two channels 56 and 58 are positioned in parallel bypassing relation to the connecting section 60 of the combined sewer. Inlet gates I3 and I4, and discharge gates D3 and D4 control the inlet to and discharge from the respective channels 56 and 58 in the same manner as described in connection with the inlet gates I1, I2 and the discharge gates D1, D2 of the channels 18 and 20 of FIG. 2. The operation of the modified embodiment of FIG. 4 is the same as described in connection with the embodiments of FIGS. 1 and 2 and will not be described again. It will be clear that under nonstorm conditions the channels 56 and 58 are equivalent to the intermediate section 16 of the combined sewer 10 of the embodiment of FIGS. 1–3, and that under storm conditions the channels 56 and 58 and the connecting section 60 are together equivalent to the intermediate section 16 of the combined sewer of the embodiment of FIGS. 1–3, since the connecting section 60 is nonfunctional under nonstorm conditions and functions merely as another flow channel under storm conditions. An inlet gate I5 may be provided between the connecting section 60 and the upstream section 52 and a discharge gate D5 may be provided between the connecting section 60 and the downstream section 54. The gates I5 and D5 would be closed under normal flow conditions but both gates would be opened under storm flow conditions to permit connecting section 60 to carry a part of the combined sewage and storm water flow under storm conditions. Suitable controls (not shown) which may be similar to the controls previously shown for opening gates I1, I2, D1, D2 under storm flow conditions, may be provided for opening the inlet and discharge gates of channels 56 and 58 and of section 60 under storm flow conditions.

While two normal or nonstorm flow channels are shown in the illustrated embodiments of FIGS. 1–4, more than two channels, such as three or four, or possibly even more, may be used, to sufficiently even-out flows in some instances. Where more than two channels are used, the principle of operation would be similar to that described in connection with two channel operation, in that some channels would be filling as others were emptying.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a sewer adapted to receive biodegradable waste material from a source of waste, said sewer including an upstream section, a downstream section, and an intermediate section, said intermediate section being connected at one end thereof to said upstream section and at an opposite end thereof to said downstream section, an inlet gate interposed between said intermediate section and said upstream section, a discharge gate interposed between said intermediate section and said downstream section, a biological contactor mounted for movement into contact with said waste material in said intermediate section, means for moving said biological contactor, and means for controlling said inlet and discharge gates whereby to fill said intermediate section with waste to a predetermined level and for subsequently discharging said waste to said downstream section.

2. The combination defined in claim 1 in which said sewer is a combined sewer adapted to receive storm water, including control means for maintaining said inlet and discharge gates open concurrently during storm flow conditions.

3. The combination defined in claim 1 in which waste is discharged to said downstream section with a flush action.

4. The combination defined in claim 1 in which said biological contactor is mounted for rotation.

5. The combination defined in claim 1 including a sump underlying said intermediate section for receiving grit and settleable solids from the waste passing through said intermediate section, and conveyor means positioned in said sump for transporting said grit and settleable solids.

6. The combination defined in claim 1 including a first sump underlying said intermediate section longitudinally of said intermediate section for receiving grit and settleable solids from the waste passing through said intermediate section, a first conveyor means positioned in said sump for receiving said grit and settleable solids, a second sump underlying said intermediate section and extending transversely of said first sump contiguous the discharge end of said first conveyor means, and a second conveyor means movable in said second sump for receiving and conveying materials discharged from said first conveyor means.

7. The combination defined in claim 1 in which said intermediate section includes a first channel and a second channel, a biological contactor mounted in each of said channels for movement into contact with waste material in the respective channels, and means for alternately filling said channels with waste and for alternately discharging said channels.

8. In combination, a sewer adapted to receive biodegradable waste material from a source of waste, said sewer including an upstream section, a downstream section, and an intermediate section, said intermediate section being connected at one end thereof to said upstream section and at an opposite end thereof to said downstream section, a biological contactor mounted for movement into contact with said waste material in said intermediate section, means for moving said biological contactor, and means for controlling the flow of waste into and through said intermediate section whereby to fill said intermediate section with waste to a predetermined level, and to maintain said waste at said predetermined level in a substantially nonflowing condition for a time interval, and for subsequently discharging said waste to said downstream section.

9. The combination defined in claim 8 in which said biological contactor is mounted for rotation.

10. In combination, a sewer adapted to receive biodegradable waste material from a source of waste, said sewer including an upstream section, a downstream section, and an intermediate section, said intermediate section being connected at one end thereof to said upstream section and at an opposite end thereof to said downstream section, said intermediate section including a first channel and a second channel, a biological contactor mounted in each of said channels for movement into contact with waste material in the respective channels, means for moving the respective biological contactors, and means for controlling the flow of waste into and through said intermediate section including means for alternately filling said channels with waste to a predetermined level and for alternately discharging said channels.

11. The combination defined in claim 10 in which each of said channels has a separate inlet gate and a separate discharge gate.

12. In combination, a sewer adapted to receive biodegradable waste material from a source of waste, said sewer including an upstream section, a downstream section, and an intermediate section, said intermediate section being connected at one end thereof to said upstream section and at an opposite end thereof to said downstream section, a biological contactor mounted for movement into contact with said waste material in said intermediate section, means for moving said biological contactor, means for controlling the flow of waste into and through said intermediate section whereby to fill said intermediate section with waste to a predetermined level and for subsequently discharging said waste to said downstream section, a sump underlying said intermediate section for receiving grit and settleable solids from the waste passing through said intermediate section, and conveyor means positioned in said sump for transporting said grit and settleable solids.

13. In combination, a sewer adapted to receive biodegradable waste material from a source of waste, said sewer including an upstream section, a downstream section, and an intermediate section, said intermediate section being connected at one end thereof to said upstream section and at an opposite end thereof to said downstream section, a biological contactor mounted for movement into contact with said waste material in said intermediate section, means for moving said biological contactor, means for controlling the flow of waste into and through said intermediate section whereby to fill said intermediate section with waste to a predetermined level and for subsequently discharging said waste to said downstream section, a first sump underlying said intermediate section longitudinally of said intermediate section for receiving grit and settleable solids from the waste passing through said intermediate section, a first conveyor means positioned in said sump for receiving said grit and settleable solids, a second sump underlying said intermediate section and extending transversely of said first sump contiguous the discharge end of said first conveyor means, and a second conveyor means movable in said second sump for receiving and conveying materials discharged from said first conveyor means.

14. The method of treating sewage which comprises the steps of flowing sewage along a sewer to a predetermined region of the sewer, temporarily blocking the flow of sewage past said predetermined region to accumulate a pool of sewage of a predetermined depth in said predetermined region, maintaining said pool in a substantially nonflowing condition for an interval of time, moving a biological contactor alternately into contact with said pool of sewage and into contact with an oxygen containing atmosphere to provide a biological treatment of said sewage, and after said biological treatment unblocking the flow of sewage to release said pool of sewage to the portion of said sewer downstream of said predetermined region.

15. The method of treating sewage as defined in claim 14 in which said pool of sewage is released with a flush action to the portion of said sewer downstream of said predetermined region.

16. The method of treating sewage as defined in claim 14 which comprises the step of rotating a biological contactor alternately into contact with said pool of sewage and with an oxygen-containing atmosphere.

17. The method of treating sewage as defined in claim 14 which comprises the step of alternately filling a first and a second channel in said predetermined region with sewage, and alternately discharging the sewage from said first and second channel with a flush action.

References Cited

UNITED STATES PATENTS

| | | | |
|---|---|---|---|
| 1,963,354 | 6/1934 | Currie | 210—221 X |
| 2,798,042 | 7/1957 | Cox | 210—17 X |
| 3,049,489 | 8/1962 | Ciabattari | 210—15 |
| 3,335,081 | 8/1967 | El-Naggar | 210—15 |
| 3,335,082 | 8/1967 | Ullrich | 210—15 |

MICHAEL E. ROGERS, Primary Examiner

U.S. Cl. X.R.

210—102, 110, 111, 151, 170, 527